United States Patent
Cho et al.

(10) Patent No.: US 9,013,310 B2
(45) Date of Patent: Apr. 21, 2015

(54) CIRCUIT STRUCTURE AND METHOD OF FABRICATION FOR FACILITATING RADIO FREQUENCY IDENTIFICATION (RFID)

(75) Inventors: Choongyeun Cho, Hopewell Junction, NY (US); Daeik Kim, Beacon, NY (US); Jonghae Kim, Fishkill, NY (US); Moon Ju Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1544 days.

(21) Appl. No.: 12/178,894

(22) Filed: Jul. 24, 2008

(65) Prior Publication Data
US 2010/0019908 A1   Jan. 28, 2010

(51) Int. Cl.
| | | |
|---|---|---|
| G08B 13/14 | (2006.01) | |
| G06K 19/077 | (2006.01) | |
| H01Q 1/22 | (2006.01) | |
| H01Q 1/24 | (2006.01) | |
| H01Q 7/00 | (2006.01) | |
| H01Q 23/00 | (2006.01) | |

(52) U.S. Cl.
CPC ........ G06K 19/07749 (2013.01); H01Q 1/2225 (2013.01); H01Q 1/248 (2013.01); H01Q 7/00 (2013.01); H01Q 23/00 (2013.01)

(58) Field of Classification Search
USPC .................. 340/572.7; 343/895; 438/387
See application file for complete search history.

(56) References Cited

U.S. PATENT DOCUMENTS

| | | | | |
|---|---|---|---|---|
| 5,430,441 A | * | 7/1995 | Bickley et al. | 340/10.2 |
| 5,751,256 A | * | 5/1998 | McDonough et al. | 343/873 |
| 5,933,317 A | * | 8/1999 | Moncrieff | 361/311 |
| 6,255,999 B1 | * | 7/2001 | Faulkner et al. | 343/895 |
| 6,268,796 B1 | | 7/2001 | Gnadinger et al. | |
| 6,567,053 B1 | * | 5/2003 | Yablonovitch et al. | 343/767 |
| 6,693,541 B2 | | 2/2004 | Egbert | |
| 6,839,035 B1 | | 1/2005 | Addonisio et al. | |
| 7,161,542 B2 | | 1/2007 | Endo et al. | |
| 7,880,680 B2 | * | 2/2011 | Yamagajo et al. | 343/718 |
| 2002/0025416 A1 | * | 2/2002 | Uchibori | 428/209 |
| 2005/0104572 A1 | | 5/2005 | Smith et al. | |
| 2006/0043198 A1 | * | 3/2006 | Forster | 235/492 |
| 2007/0046369 A1 | | 3/2007 | Schober et al. | |
| 2007/0080889 A1 | * | 4/2007 | Zhang | 343/895 |
| 2008/0150729 A1 | * | 6/2008 | Appalucci et al. | 340/572.8 |
| 2009/0309703 A1 | * | 12/2009 | Forster | 340/10.1 |

* cited by examiner

*Primary Examiner* — George Bugg
*Assistant Examiner* — Naomi Small
(74) *Attorney, Agent, or Firm* — Lisa Ulrich, Esq.; Kevin P. Radigan, Esq.; Heslin Rothenberg Farley & Mesiti P.C.

(57) ABSTRACT

A radio frequency identification (RFID) device and method of fabrication are presented. The RFID device includes an RFID antenna, a capacitor, and an RFID integrated circuit. The RFID antenna includes an elongate conductive trace disposed within an antenna area of the RFID device, and the capacitor includes an elongate capacitive structure for storing power. The elongate capacitive structure is aligned with the elongate conductive trace and embedded within the antenna area of the RFID device. The RFID integrated circuit is electrically coupled to the RFID antenna and to the capacitor, and the capacitor stores power within the antenna area of the RFID device to facilitate RFID integrated circuit functionality.

18 Claims, 7 Drawing Sheets

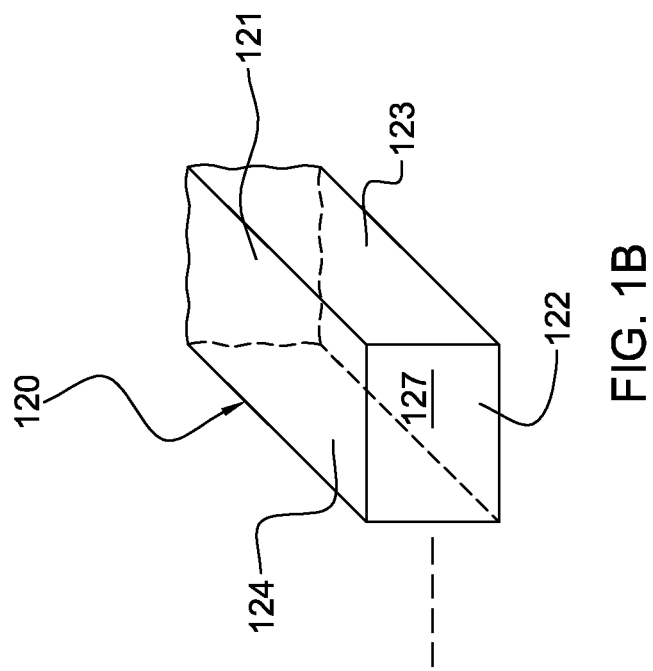
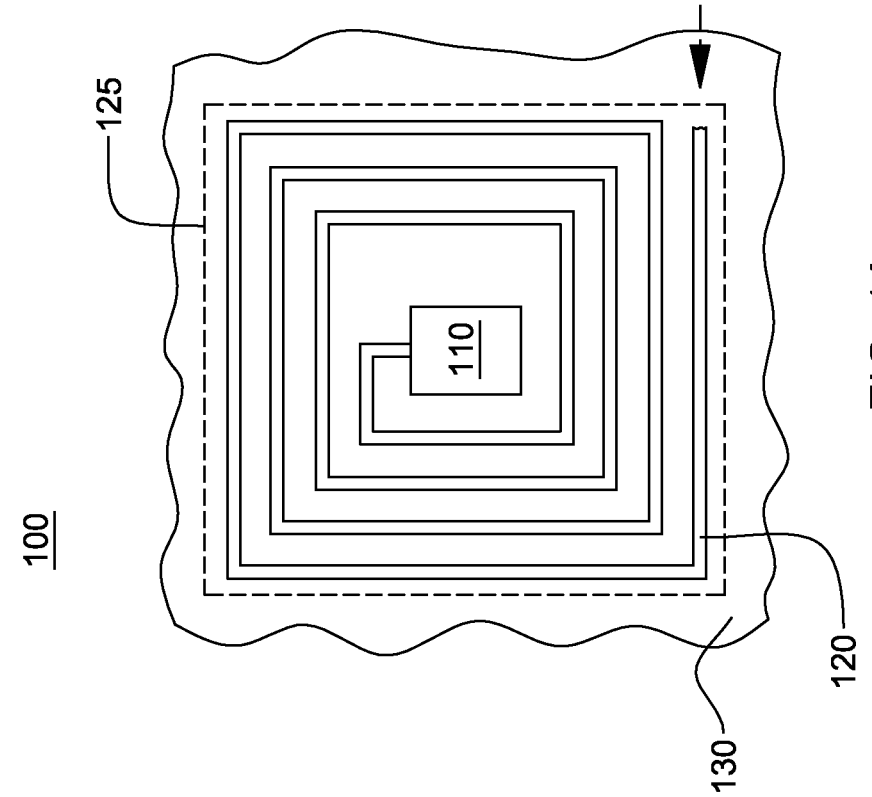
FIG. 1B
FIG. 1A

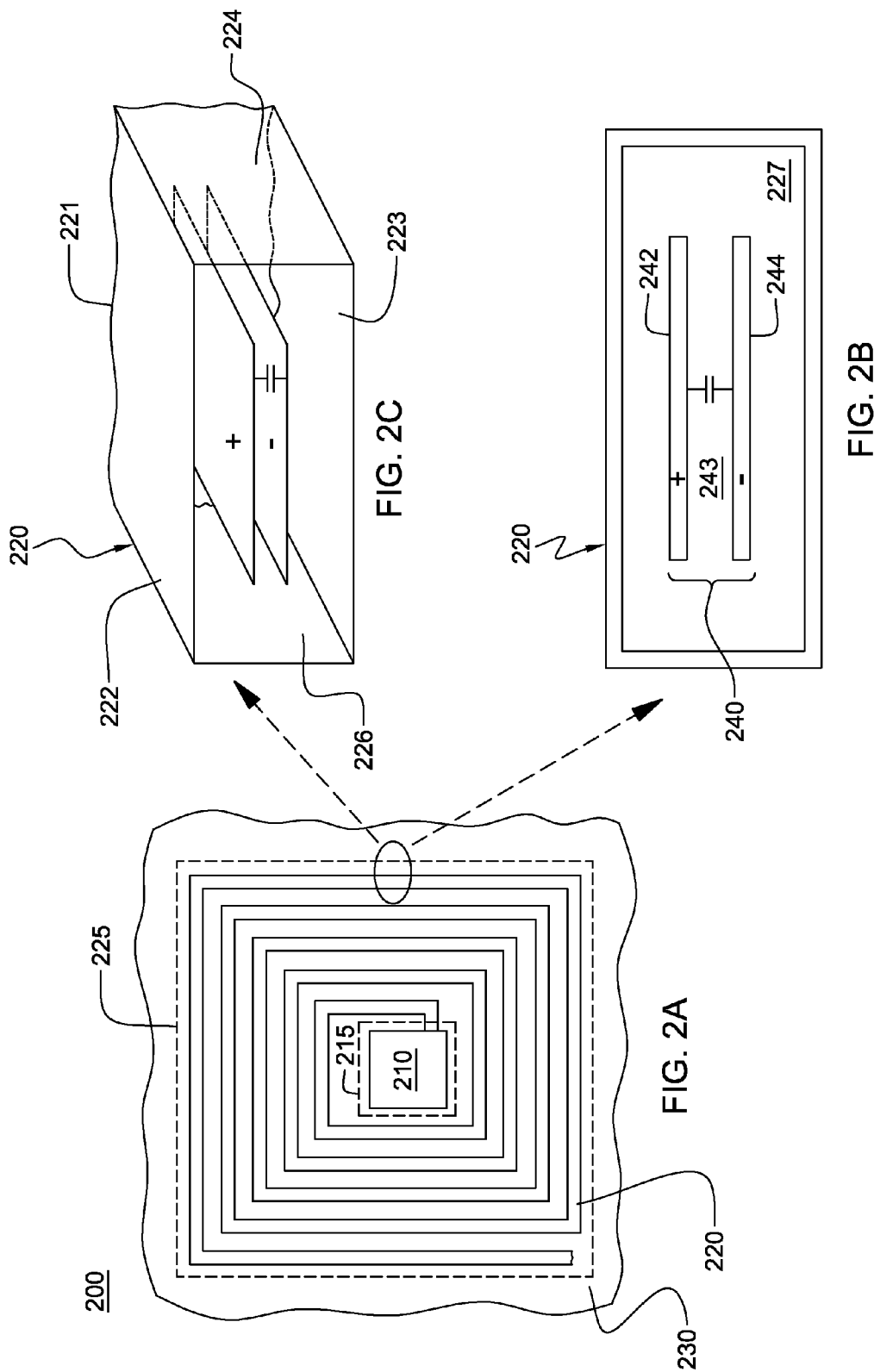

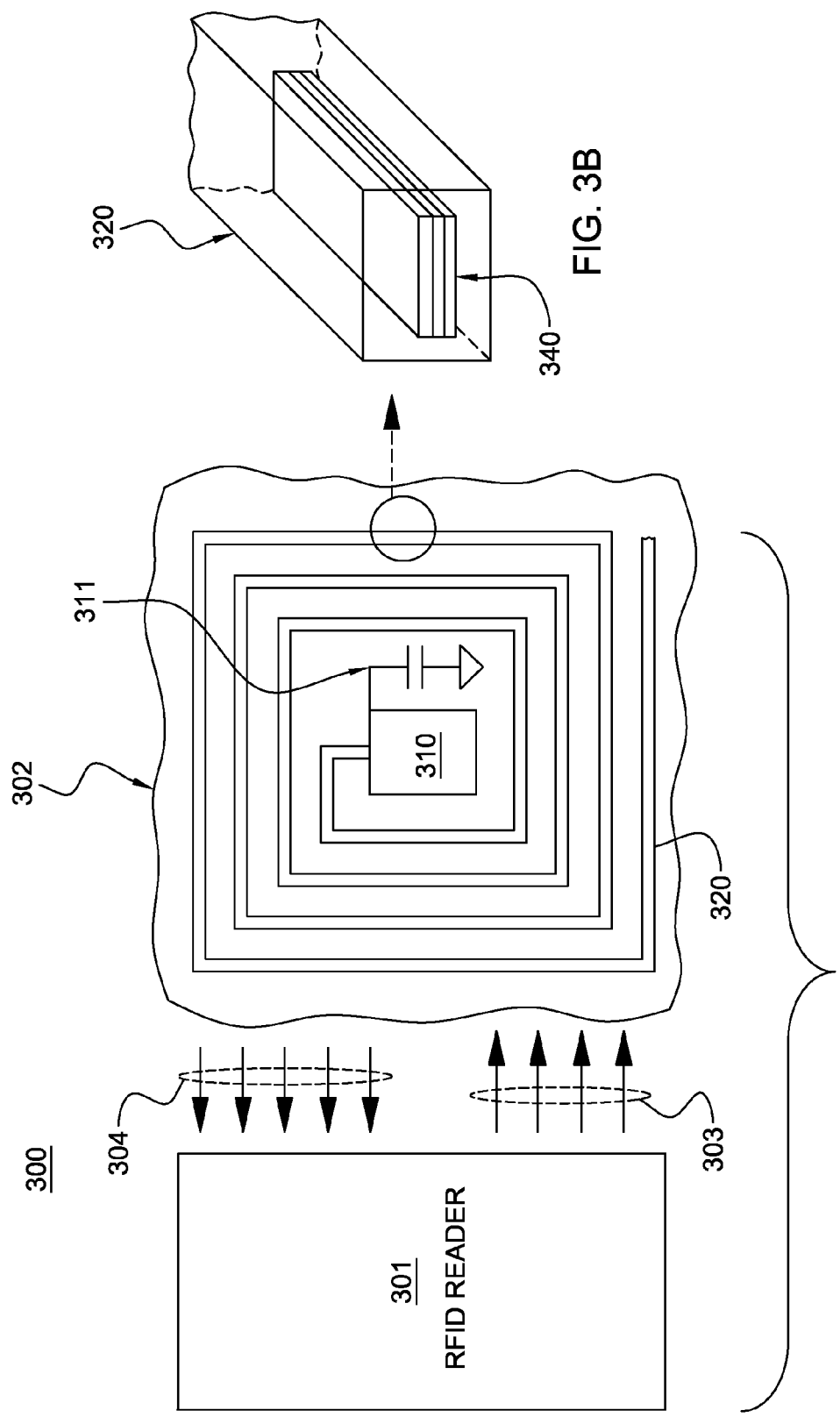

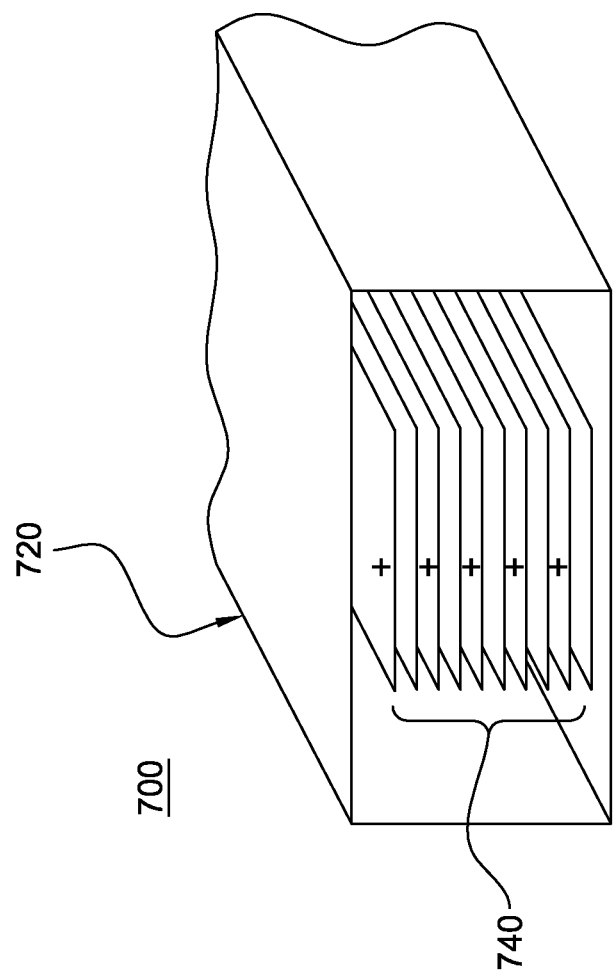

CIRCUIT STRUCTURE AND METHOD OF FABRICATION FOR FACILITATING RADIO FREQUENCY IDENTIFICATION (RFID)

FIELD OF THE INVENTION

The present invention relates in general to radio frequency identification (RFID) devices and methods of fabrication, and more particularly, to RFID devices and methods of fabrication wherein a capacitor is integrated within the antenna area of the RFID device.

BACKGROUND OF THE INVENTION

Conventionally, an RFID device can be considered to have two primary components, that is, an antenna and an integrated circuit (IC). The IC includes circuitry to interface with the antenna, encode or decode logic circuitry, signal processing circuitry, memory, and possibly other functionalities. The memory, which is generally non-volatile memory, is usually of small size, such as several hundred bits, although any size could theoretically be employed. The IC typically includes a coupling capacitor for storing transmitted energy from the electromagnetic field generated by an RFID reader to the IC of the RFID device.

The RFID antenna, which is commonly a coil type antenna, interacts with the electromagnetic field and is electrically interconnected to the IC. The antenna is tuned to the frequency of the reader device with which the antenna is intended to be used. For example, 13.56 MHZ is a commonly used frequency. As one example, the RFID antenna is typically made of a thin stripe of metal referred to herein as a conductive trace. The RFID antenna receives a radio frequency signal from the RFID reader and converts the signal to DC power, which is stored in the coupling capacitor of the IC. This stored DC power is generally small, but considered sufficient to transmit stored identification information to the RFID reader. Unfortunately, in certain implementations, this weak energy is insufficient to send the information to the RFID reader.

SUMMARY OF THE INVENTION

Accordingly, provided herein, in one aspect, is a circuit structure for facilitating radio frequency identification (RFID). The circuit structure includes an RFID antenna and a capacitor. The RFID antenna includes an elongate conductive trace, and the capacitor includes at least one elongate capacitive structure, wherein the at least one elongate capacitive structure is aligned with the elongate conductive trace of the RFID antenna. The capacitor stores power within the antenna area, and thereby facilitates RFID functionality.

In another aspect, a radio frequency identification (RFID) device is provided. The RFID device includes an RFID antenna, a capacitor and an RFID integrated circuit. The RFID antenna includes an elongate conductive trace disposed within an antenna area of the RFID device, and the capacitor includes at least one elongate capacitive structure for storing power. The at least one elongate capacitive structure is embedded within the antenna area of the RFID device. The RFID integrated circuit electrically couples to the RFID antenna and to the capacitor, wherein the capacitor stores power within the antenna area of the RFID device to facilitate RFID integrated circuit functionality.

In a further aspect, a method of fabricating a circuit structure for facilitating radio frequency identification (RFID) is provided. The method includes: forming an RFID antenna comprising an elongate conductive trace; forming a capacitor comprising at least one elongate capacitive structure; and wherein at least one of forming the RFID antenna or forming the capacitor comprises aligning the at least one elongate capacitive structure and the elongate conductive trace, and wherein forming the capacitor further comprises sizing the capacitor relative to the elongate conductive trace to be hidden electromagnetically by the elongate conductive trace from a radio frequency wave to be detected by the RFID antenna when the circuit structure is operationally employed.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed in the claims at the conclusion of the specification. The foregoing and other objects, features, and advantages of the invention are apparent from the following detailed description taken in conjunction with the accompanying drawings in which:

FIG. 1A is a plan view of one embodiment of an RFID device within which a capacitor is to be integrated, in accordance with an aspect of the present invention;

FIG. 1B is a partial perspective view of one embodiment of an RFID antenna configured to receive a capacitor, in accordance with an aspect of the present invention;

FIG. 2A is a plan view of an alternate embodiment of an RFID device, in accordance with an aspect of the present invention;

FIG. 2B is a cross-sectional elevational view of a circuit structure comprising the RFID antenna and a capacitor of the RFID device of FIG. 2A, in accordance with an aspect of the present invention;

FIG. 2C is a partial isometric view of the circuit structure of FIG. 2B, in accordance with an aspect of the present invention;

FIG. 3A is a plan view of one embodiment of an operational exchange of information between an RFID reader and an RFID device, wherein the RFID device is configured in accordance with an aspect of the present invention;

FIG. 3B is a partial isometric view of a circuit structure, comprising an RFID antenna and embedded capacitor, employed in the RFID device of FIG. 3A, in accordance with an aspect of the present invention;

FIG. 7 is a partial isometric view of a further embodiment of a circuit structure for facilitating radio frequency identification, in accordance with an aspect of the present invention.

DETAILED DESCRIPTION OF THE INVENTION

Figure 4:
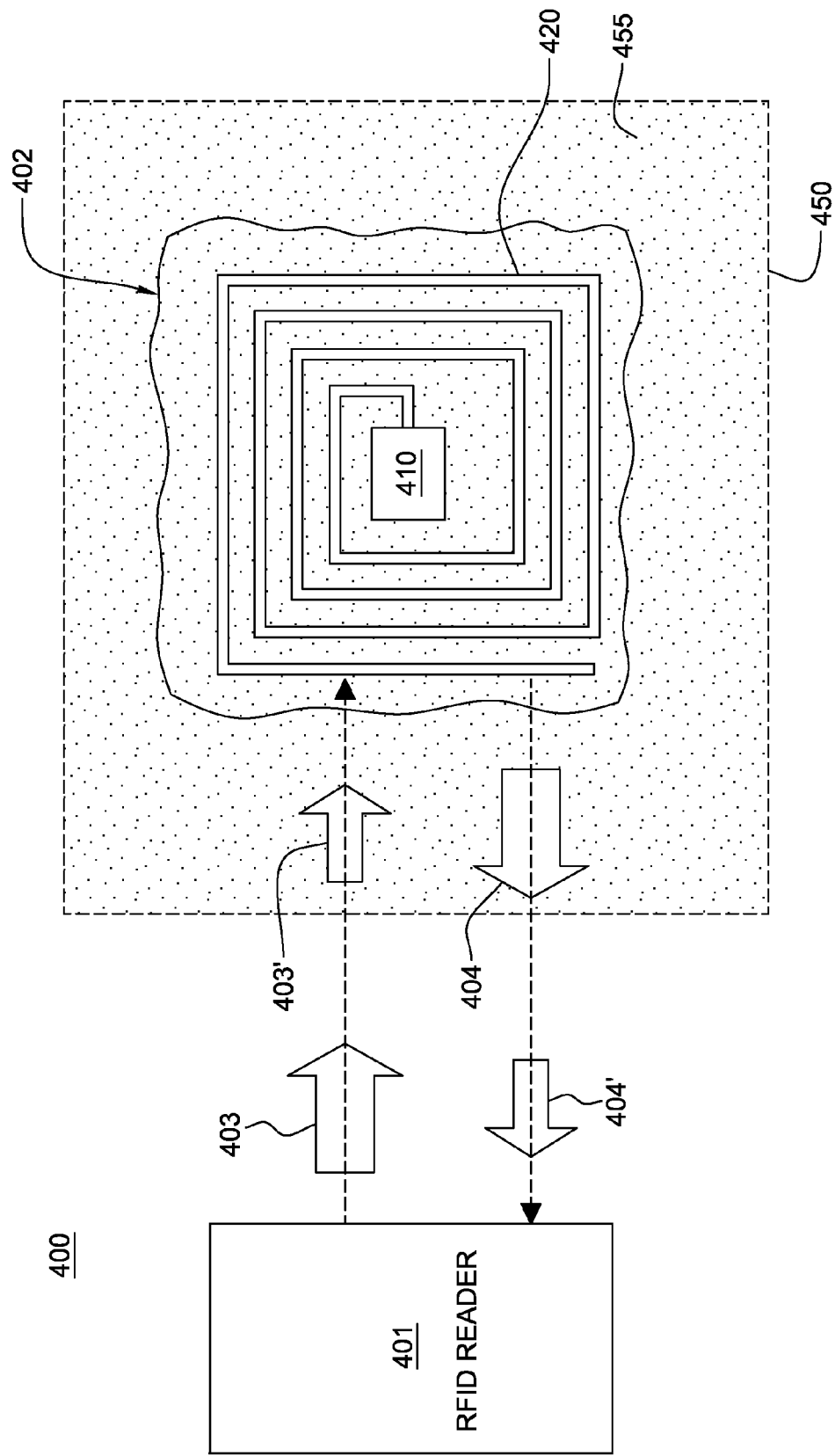
FIG. 4 is a plan view of another embodiment of an operational exchange of information between an RFID reader and an RFID device, wherein the RFID device is configured in accordance with an aspect of the present invention.

Generally stated, disclosed herein is a circuit structure, RFID device, and method of fabrication thereof for facilitating radio frequency identification (RFID). The circuit structure includes an RFID antenna comprising an elongate conductive trace, and a capacitor comprising at least one elongate capacitive structure. The at least one elongate capacitive structure is disposed within the antenna area of the RFID device and aligned with the elongate conductive trace of the RFID antenna. Advantageously, by embedding the capacitor within the antenna area of the RFID device, ample space is provided for the capacitor to embody a high capacity rechargeable battery.

As used herein, the term "radio frequency" encompasses all frequencies of electromagnetic waves that can be sensed by an antenna, and unless otherwise indicated is not limited to a specific frequency.

FIG. 1A depicts one embodiment of an RFID device, generally denoted 100, to employ a circuit structure in accordance with an aspect of the present invention. RFID device 100 includes an RFID integrated circuit 110, which may be a separately fabricated integrated circuit chip, and an RFID antenna 120, shown in a coil configuration within an antenna area 125 on a substrate or thin film material 130. Current RFID antenna design is typically to employ a thin conductive trace, such as a stripe of metal. This antenna is configured to receive the designated radio frequency signals from an RFID reader (as discussed further below), and convert the signals to DC power, which is then stored within a coupling capacitor disposed on the RFID integrated circuit 110. Size of the coupling capacitor is typically constrained in view of its integration into the RFID integrated circuit. The DC power in the coupling capacitor is employed to produce and transmit the stored information of the integrated circuit to the RFID reader. Unfortunately, in certain situations, the energy level of the RFID device may be insufficient to send the RFID information to the RFID reader. This energy level limitation, resulting in part from limited storage capacity for power being delivered from the reader to the slave device, restricts RFID integrated circuit functionality, for example, to perform smart operations. Thus, a larger re-usable power source would be commercially desirable for the RFID device.

FIG. 1B depicts one implementation of an RFID antenna of a circuit structure, in accordance with an aspect of the present invention. This isometric view of one embodiment of RFID antenna 120 includes an upper elongate conductive trace 121 and a lower elongate conductive trace 122, which are aligned and spaced in opposing relation. Further, a first side conductive structure 123 and a second side conductive structure 124 electrically interconnect the first conductive trace 121 and second conductive trace 122 to form in transverse cross-section, a rectangular-shaped antenna. In one embodiment, this rectangular-shaped antenna is filled with a dielectric material 127.

As illustrated in FIGS. 2A-2C, a circuit structure is provided herein wherein a capacitor is integrated with the RFID antenna, and thus disposed within the antenna area of the RFID device. As shown in FIG. 2A, an RFID device 200, in accordance with an aspect of the present invention, includes an RFID integrated circuit 210 disposed within an integrated circuit area 215 of the device, and a circuit structure 220 disposed within an antenna area 225 of the RFID device 200.

The RFID device 200 resides on, for example, a substrate or thin film material 230. Circuit structure 220 includes an RFID antenna 221 (see FIG. 2C), such as the RFID antenna described above in connection with FIG. 1B, and an elongate capacitive structure 240. Elongate capacitive structure 240 is shown in FIG. 2B to include a first conductive plate 242 and a second conductive plate 244 space in opposing relation with a dielectric material 243 disposed therebetween. Dielectric material 243 may be the same dielectric material or a different dielectric material as dielectric material 227 employed within the balance of the rectangular-shaped RFID antenna 221. Further, the conductive material employed in fabricating first capacitor plate 242 and second capacitor plate 244 may be the same or a different conductive material than the conductive material employed in forming RFID antenna 221.

FIG. 2C illustrates an isometric view of circuit structure 220, wherein RFID antenna 221 includes a first elongate conductive trace 222 and a second elongate conductive trace 223, which are aligned in spaced relation in the coil configuration illustrated in FIG. 2A. Further, a first side conductive structure 224 and a second side conductive structure 226 are provided electrically interconnecting first elongate conductive trace 222 and second elongate conductive trace 223. By disposing the elongate capacitive structure 240 within RFID antenna 221, within the relatively large antenna area of the RFID device, a high capacity capacitor is achieved. Further, radio frequency interference is minimum, and the basic antenna design can be readily constructed. By way of specific example, the conductive material forming the RFID antenna and the conductive material forming the capacitor may be aluminum, copper, an aluminum alloy or a copper alloy, and dielectric material 227 and dielectric material 243 may be the same dielectric material, such as silicon dioxide. Advantageously, by providing a high capacity capacitor aligned with or disposed within the RFID antenna, RFID operational capacity and/or RFID electrical power and sustainability of the device is significantly increased, and additional operations may be implemented by the RFID device. Existing semiconductor and/or printed circuit board technologies may be readily employed to form the elongate capacitive structure within or aligned with the RFID antenna, as explained further below. As one example, the elongate capacitive structure may be formed as a conventional metal-insulator-metal (MIM) capacitor. By disposing the elongate capacitive structure within the antenna area and aligning the capacitor with the elongate conductive trace of the antenna, interference of the capacitor with antenna performance is minimized. Again, those skilled in the art will note from the description provided herein that fabrication of the circuit structure presented is compatible with existing lithography and stacking techniques (that is, using traditional semiconductor fabrication or printed circuit board fabrication processes, as illustrated further below).

FIGS. 3A & 3B depict one embodiment of a radio frequency identification 300, wherein there is an operational exchange of information between an RFID reader 301 and an RFID device 302. In this example, RFID reader 301 transmits electromagnetic power 303 to RFID device 302, and the RFID device stores this power as electrical energy within, for example, two capacitors 311 and 340. As illustrated in FIG. 3A, capacitor 311 schematically represents a conventional coupling capacitor integrated within the RFID integrated circuit 310. Capacitor 340 (shown in FIG. 3B) is an elongate capacitive structure disposed, in the illustrated embodiment, within an RFID antenna 320 of the RFID device 302. In this design, capacitor 340 is significantly larger than coupling capacitor 311 associated with RFID integrated circuit 310, and hence is the main power storage capacitor for the RFID device. If desired, capacitor 311 may be optimally omitted from the RFID device. RFID integrated circuit 310 draws power from the elongate capacitive structure to transmit the RFID tag information 304 to RFID reader 301. Alternatively, power for transmitting the RFID tag information could be drawn from coupling capacitor 311, with power within the elongate capacitive structure being used for main chip processing power. Advantageously, the additional power provided by capacitor 340 disposed within the antenna area can extend the transmitting period for the RFID tag information, and/or allow for greater integrated circuit chip processing, for example, for RFID smart functionality.

FIG. 4 depicts another embodiment of a radio frequency identification 400, wherein there is an operational exchange of information between an RFID reader 401 and an RFID device 402 disposed within, or transmitting through, a liquid 455 (such as water) disposed within a container 450. For example, RFID device 402 may be disposed on the opposite side of a water bottle to be scanned by an RFID reader 401. In operation, RFID reader 401 transmits a high power signal 403 to RFID device 402. This high power signal 403 is attenuated by container 450 and liquid 455 into a smaller power signal 403', which is detected by the RFID antenna 420 of RFID device 402. (Attenuation of power results from the radio frequency wave being absorbed in the normal channel and the blocking media.) The received radio frequency signal is rectified by RF circuit 410 to DC power for RFID information processing and RF transmission. The RFID integrated circuit 410 responds to receipt of the signal by sending RFID tag information 404 back to RFID reader 401. In view of the larger power storage capacity of the elongate capacitive structure integrated within the RFID antenna, a larger RFID tag information signal may be sent from the RFID device 402. This signal attenuates as it transmits through the liquid 455 and the container wall 450, with a sufficiently sized RFID tag information signal 404' being returned to the RFID reader 401 for sensing (that is, the RFID tag information signal 404' is stronger than RFID reader 401 sensitivity).

FIGS. 5A-7 depict various alternate embodiments of a circuit structure for facilitating radio frequency identification, in accordance with an aspect of the present invention. Manufacturing practice trade-offs may result in one or more of the depicted approaches being preferred for a particular RFID device implementation.

Figure 5B:
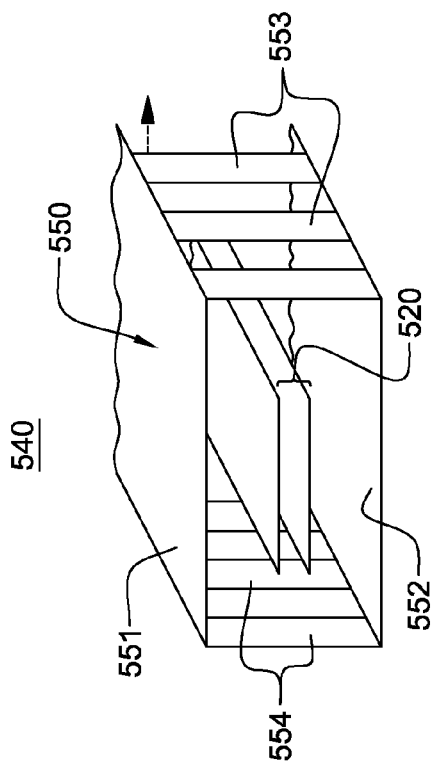
FIG. 5B is a partial isometric view of still another embodiment of a circuit structure for facilitating radio frequency identification, in accordance with an aspect of the present invention.
Figure 5A:
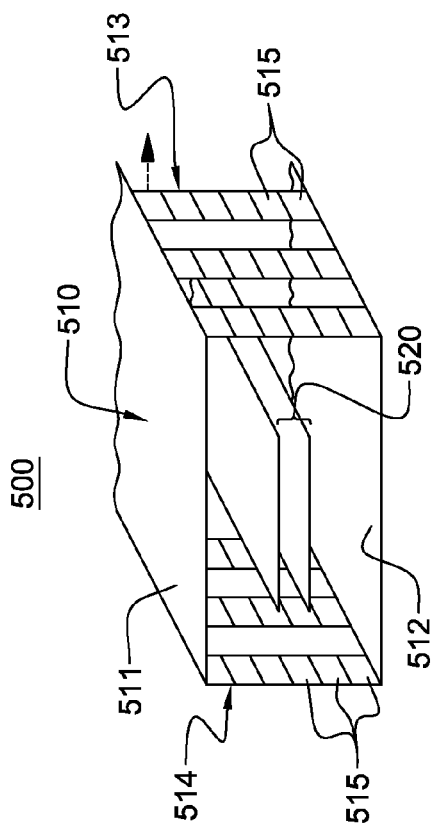
FIG. 5A is a partial isometric view of another embodiment of a circuit structure for facilitating radio frequency identification, in accordance with an aspect of the present invention.

In FIG. 5A, semiconductor processing technology is employed in fabricating the illustrated circuit structure 500. Circuit structure 500 includes an RFID antenna 510, such as the coil-configured RFID antennas described above, with an embedded capacitor comprising an elongate capacitive structure 520. RFID antenna 510 includes a first elongate conductive trace 511 and a second elongate conductive trace 512 aligned vertically and disposed in spaced, opposing relation in a multi-layer stack, for example, in the coil configuration. A plurality of side conductive structures 513 are disposed on a first side of the RFID antenna 510 and a plurality of side conductive structures 514 are disposed on a second side of RFID antenna 510. These side conductive structures 513, 514 electrically connect first elongate conductive trace 511 and second elongate conductive trace 512, and together the first and second elongate conductive traces 511, 512 and side conductive structures 513, 514 form a substantially rectangular-shaped RFID antenna within which the elongate capacitive structure 520 is embedded. In one implementation, the side conductive structures comprise one or more metallized vias which interconnect the first and second elongate conductive traces and provide electromagnetic shielding for the elongate capacitive structure. In the embodiment illustrated, each side conductive structure 513, 514 is shown to comprise a plurality of aligned conductive vias 515. Also, in one implementation, the height of the side openings between the first and second elongate conductive traces is assumed to be smaller than the wavelength of the radio frequency wave to be detected, thereby maximizing connection efficiency and minimizing radio frequency interference.

FIG. 5B depicts a similar circuit structure 540 to that depicted in FIG. 5A, only the assumption in FIG. 5B is that the circuit structure is fabricated using printed circuit board technology. Circuit structure 540 includes an RFID antenna 550 comprising a first elongate conductive trace 551 and a second elongate conductive trace 552, which are aligned and spaced in opposing relation in a coil configuration, such as described above in connection with FIGS. 2A-4. A plurality of side conductive structures 553, 554 are disposed on the two sides of the RFID antenna to electrically connect first elongate conductive trace 551 and second elongate conductive trace 552. By way of example, each side conductive structure 553, 554 may be formed as a conductive through-hole using printed circuit board technology. As illustrated, an elongate capacitive structure 520 is disposed within the rectangular-shaped RFID antenna, and thus, embedded within the antenna area of the RFID device.

Figure 6B:
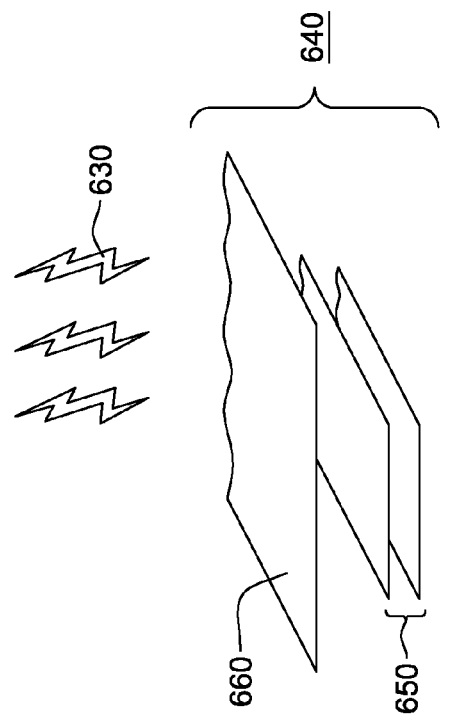
FIG. 6B is a partial isometric view of another alternate embodiment of a circuit structure for facilitating radio frequency identification, in accordance with an aspect of the present invention.
Figure 6A:
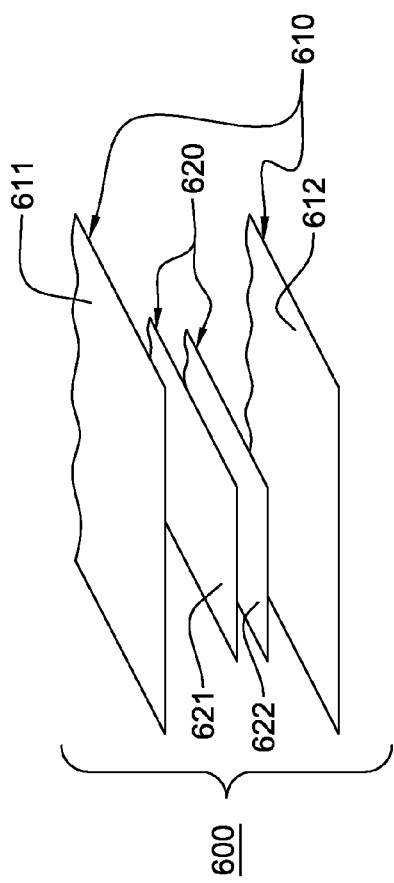
FIG. 6A is a partial isometric view of an alternate embodiment of a circuit structure for facilitating radio frequency identification, in accordance with an aspect of the present invention.

FIG. 6A depicts an alternate embodiment of a circuit structure 600, which includes an RFID antenna 610 and an elongate capacitive structure 620, in accordance with an aspect of the present invention. As illustrated, elongate capacitive structure 620 is aligned with and disposed between a first elongate conductive trace 611 and a second elongate conductive trace 612 of the RFID antenna 610. The first and second elongate conductive traces of the RFID antenna are vertically aligned and spaced in opposing relation, with the space between the first and second elongate conductive traces containing a dielectric material (not shown). Embedded within this dielectric material is an elongate capacitive structure comprising a first plate 621 and a second plate 622, disposed in spaced relation with the dielectric material therebetween to define the capacitor. In one example, the first and second elongate conductive traces are electrically connected together at their ends (not shown) for antenna efficiency. The side conductive structures illustrated in FIGS. 5A & 5B are omitted in this embodiment to reduce cost of the circuit structure. There would be little sacrifice of antenna efficiency in this design, and because of the small dimensions involved, minimal shielding degradation on the elongate capacitive structure. This embodiment assumes that the radio frequency wave to be detected by the RFID antenna 610 is substantially larger than the space between the first and second elongate conductive traces 611, 612, making it unlikely that the elongate capacitive structure would be effected by the radio frequency wave.

FIG. 6B illustrates a further circuit structure embodiment 640, wherein the RFID antenna comprises a single elongate conductive trace 660 and one or more elongate capacitive structures 650 are disposed beneath the elongate capacitive trace 660. The one or more elongate capacitive structures are again aligned with the RFID antenna, for example, in a coil configuration such as depicted above in connection with FIGS. 2A-4. In this embodiment, it is assumed that the radio frequency wave 630 impacts the RFID device from a known direction, with the elongate conductive trace 660 being disposed between the RFID reader and the one or more elongate capacitive structures 650. This circuit structure embodiment represents a special case where the radio frequency wave is incident on, for example, the upper elongate conductive trace only. Note that if the radio frequency wave were anticipated to be incident only on the lower elongate conductive trace 612 depicted in FIG. 6A, then the one or more elongate capacitive structures 650 would be aligned with and disposed over the elongate conductive trace of the RFID antenna.

FIG. 7 depicts a further alternate embodiment of a circuit structure, generally denoted 700, in accordance with an aspect of the present invention. This circuit structure again facilitates radio frequency identification and is incorporated within an RFID device, such as described above in connection with FIGS. 2A-4. In this embodiment, the circuit structure includes an RFID antenna 720 and multiple, stacked elongate capacitive structures 740 defining multiple stacked capacitors. By stacking and electrically connecting two or more elongate capacitive structures within the RFID antenna 720, even more enhanced power storage is provided for the RFID device. Note that in this embodiment, the RFID antenna is again illustrated as the antenna embodiment described above in connection with FIGS. 2A-4. However, the multiple, stacked elongate capacitive structures could similarly be integrated with or constructed for any one of the RFID antenna embodiments disclosed herein.

Advantageously, presented herein is an enhanced circuit structure, wherein an elongate capacitive structure is embedded within an antenna area of an RFID antenna to supplement or replace the limited capacitive storage typically provided in an RFID integrated circuit chip. The antenna area conventionally covers approximately 50% or more of an RFID tag, including the spacing between the winding. This results in a 10 to 100 times greater capacitance area than that typically provided in an RFID integrated circuit chip. Thus, capacitor size increases in the order of 10-100× is achieved, providing significant power gain.

A common RFID frequency is 13.56 MHz, which has a wavelength of 22.12 m. A practical RFID antenna is 5-7 turns around, for example, a credit card sized area for an approximate 0.2 m RFID distance. Conventionally, the RFID antenna is printed on a thin film material using copper or aluminum. In accordance with the present invention, multiple thin film layers and inter-layer conductive connections are readily employed to embed a capacitor between, for example, upper and lower elongate conductive traces of the RFID antenna.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A circuit structure for facilitating radio frequency identification (RFID), the circuit structure comprising:
a multi-layer RFID antenna comprising a first layer and a second layer, the first layer and second layer being parallel layers of the multi-layer RFID antenna, wherein the first layer comprises an upper elongate conductive trace and the second layer comprises a lower elongate conductive trace; and
at least one elongate capacitor separate from and disposed between the first layer and the second layer, the at least one elongate capacitor being aligned with the upper and lower elongate conductive traces in the first layer and the second layer of the RFID antenna, wherein the upper and lower elongate conductive traces of the RFID antenna are disposed in a coil configuration comprising more than one revolution and the at least one elongate capacitor is disposed in a corresponding coil configuration comprising more than one revolution aligned with the coil configuration of the upper and lower elongate conductive traces of the RFID antenna, the coil configuration of the at least one elongate capacitor providing a configuration and sizing of the at least one elongate capacitor to facilitate storage of power for powering an RFID integrated circuit of the circuit structure to facilitate RFID functionality.

2. The circuit structure of claim 1, wherein the at least one elongate capacitor is sized and positioned relative to the upper and lower elongate conductive traces to be hidden electromagnetically by the upper and lower elongate conductive traces from a radio frequency wave to be detected by the RFID antenna when the circuit structure is operationally employed.

3. The circuit structure of claim 2, wherein the at least one elongate capacitor is aligned with and disposed between the upper and lower elongate conductive traces of the RFID antenna.

4. The circuit structure of claim 1, wherein the upper elongate conductive trace and the lower elongate conductive trace are disposed parallel and aligned in spaced opposing relation within the multi-layer RFID antenna.

5. The circuit structure of claim 4, wherein the RFID antenna further comprises at least one side conductive structure electrically connecting the upper elongate conductive trace and the lower elongate conductive trace thereof, wherein the at least one elongate capacitor is disposed spaced apart from, and within a space defined between, the upper elongate conductive trace, the lower elongate conductive trace, and the at least one side conductive structure of the RFID antenna.

6. The circuit structure of claim 1, further comprising a plurality of side conductive structures disposed on a common side of the RFID antenna, the plurality of side conductive structures electrically connecting the upper elongate conducive trace and the lower elongate conductive trace.

7. The circuit structure of claim 6, wherein the plurality of side conductive structures comprises multiple side conductive structures disposed on a first side and multiple side conductive structures disposed on a second side of the RFID antenna, wherein the upper elongate conductive trace, lower elongate conductive trace, and the plurality of side conductive structures electrically connect together and electromagnetically hide the at least one elongate capacitor from a radio frequency wave to be detected by the RFID antenna when the circuit structure is operationally employed.

8. The circuit structure of claim 1, wherein the at least one elongate capacitor comprises multiple, stacked elongate capacitive structures defining multiple elongate capacitors, the multiple, stacked elongate capacitive structures being aligned with the upper and lower elongate conductive traces of the RFID antenna.

9. A radio frequency identification (RFID) device comprising:
a multi-layer RFID antenna comprising a first layer and a second layer, the first layer and second layer being parallel layers of the multi-layer RFID antenna, wherein the first layer comprises an upper elongate conductive trace and the second layer comprises a lower elongate conductive trace, the upper and lower elongate conductive traces being disposed within an antenna area of the RFID device;
at least one elongate capacitor for storing power, the at least one elongate capacitor being embedded within the antenna area of the RFID device and disposed between the first layer and the second layer; and an RFID integrated circuit electrically coupled to the RFID antenna and to the at least one elongate capacitor, wherein the upper and lower elongate conductive traces of the RFID antenna are disposed in a coil configuration comprising more than one revolution and the at least one elongate capacitor is disposed in a corresponding coil configuration comprising more than one revolution aligned with the coil configuration of the upper and lower elongate conductive traces of the RFID antenna, the coil configuration of the at least one elongate capacitor providing a configuration and sizing of the at least one elongate capacitor to facilitate storage of power for powering the RFID integrated circuit to facilitate RFID integrated circuit functionality.

10. The RFID device of claim 9, wherein the at least one elongate capacitor is aligned with the upper and lower elongate conductive traces of the RFID antenna, and wherein the at least one elongate capacitor is sized and positioned relative to the upper and lower elongate conductive traces to be hidden electromagnetically by the upper and lower elongate conductive traces from a radio frequency wave to be detected by the RFID antenna when the RFID device is operational.

11. The RFID device of claim 9, wherein the at least one elongate capacitor is aligned with and disposed between the upper and lower elongate conductive traces of the RFID antenna.

12. The RFID device of claim 9, wherein the upper elongate conductive trace and the lower elongate conductive trace are disposed parallel and aligned in spaced, opposing relation within the multi-layer RFID antenna.

13. The RFID device of claim 12, wherein the RFID antenna further comprises at least one side conductive structure electrically connecting the upper elongate conductive trace and the lower elongate conductive trace thereof, and wherein the at least one elongate capacitor is disposed spaced apart from, and within a space defined between, the upper elongate conductive trace, the lower elongate conductive trace, and the at least one side conductive structure of the RFID antenna.

14. The RFID device of claim 13, further comprising a plurality of side conductive structures comprising multiple side conductive structures disposed on a first side and multiple side conductive structures disposed on a second side of the RFID antenna, the plurality of side conductive structures electrically connecting the upper elongate conductive trace and the lower elongate conductive trace, and wherein the upper elongate conductive trace, the lower elongate conductive trace, and the plurality of side conductive structures electrically connect together and electromagnetically hide the at least one elongate capacitor from a radio frequency wave to be detected by the RFID antenna when the RFID device is operationally employed.

15. The RFID device of claim 9, wherein the at least one elongate capacitor comprises multiple, stacked elongate capacitive structures defining multiple elongate capacitors, the multiple, stacked elongate capacitive structures being aligned with the upper and lower elongate conductive traces of the RFID antenna within the antenna area of the RFID device.

16. A method of fabricating a circuit structure for facilitating radio frequency identification (RFID), the method comprising:

forming a multi-layer RFID antenna comprising a first layer and a second layer, the first layer and second layer being parallel layers of the multi-layer RFID antenna, wherein the first layer comprises an upper elongate conductive trace and the second layer comprises a lower elongate conductive trace;

providing at least one elongate capacitor disposed between the first layer and the second layer of the multi-layer RFID antenna; and wherein at least one of forming the RFID antenna or providing the at least one elongate capacitor comprises aligning the at least one elongate capacitor and the upper and lower elongate conductive traces, wherein the upper and lower elongate conductive traces of the RFID antenna are disposed in a coil configuration comprising more than one revolution and the at least one elongate capacitor is disposed in a corresponding coil configuration comprising more than one revolution aligned with the coil configuration of the upper and lower elongate conductive traces of the RFID antenna, the coil configuration of the at least one elongate capacitor providing a configuration and sizing of the at least one elongate capacitor to facilitate storage of power for powering an RFID integrated circuit of the circuit structure to facilitate the RFID.

17. The method of claim 16, wherein the upper elongate conductive trace and the lower elongate conductive trace are disposed parallel and aligned in spaced, opposing relation within the multi-layer RFID antenna.

18. The method of claim 16, wherein providing the at least one elongate capacitor disposed between the first layer and the second layer of the multi-layer RFID antenna comprises providing the at least one elongate capacitor with a size relative to the upper and lower elongate conductive traces to be hidden electromagnetically by the upper and lower elongate conductive traces from a radio frequency wave to be detected by the RFID antenna when the circuit structure is operationally employed.

* * * * *